(12) United States Patent
Liao et al.

(10) Patent No.: US 12,028,659 B2
(45) Date of Patent: Jul. 2, 2024

(54) INFORMATION HANDLING SYSTEM CAMERA VISUAL IMAGE COLOR TUNING BASED ON SENSED AMBIENT LIGHT COLOR

(71) Applicant: Dell Products L.P., Round Rock, TX (US)

(72) Inventors: Chien-Chih Liao, Taipei (TW); Karthikeyan Krishnakumar, Austin, TX (US); Shohrab Sheikh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 17/872,202

(22) Filed: Jul. 25, 2022

(65) Prior Publication Data
US 2024/0031542 A1    Jan. 25, 2024

(51) Int. Cl.
*H04N 9/77* (2006.01)
*G01J 1/42* (2006.01)
*G01J 3/50* (2006.01)
*H04N 9/64* (2023.01)
*H04N 23/71* (2023.01)
*H04N 23/88* (2023.01)

(52) U.S. Cl.
CPC .............. *H04N 9/77* (2013.01); *G01J 1/4204* (2013.01); *G01J 3/50* (2013.01); *H04N 9/643* (2013.01); *H04N 23/71* (2023.01); *H04N 23/88* (2023.01)

(58) Field of Classification Search
CPC .......... H04N 9/77; H04N 9/643; H04N 23/71; H04N 23/88; G01J 1/4204; G01J 3/50
See application file for complete search history.

(56) References Cited

U.S. PATENT DOCUMENTS

| | | | |
|---|---|---|---|
| 8,103,094 B2 | 1/2012 | Wilensky | |
| 9,355,466 B2 | 5/2016 | Kakinuma et al. | |
| 9,565,410 B2 | 2/2017 | Huai | |
| 2010/0302447 A1* | 12/2010 | Shirai | H04N 21/4122 348/E5.119 |
| 2013/0208981 A1* | 8/2013 | Kong | G06T 7/00 382/162 |
| 2014/0184763 A1* | 7/2014 | Goldenberg | H04N 23/90 348/63 |

(Continued)

OTHER PUBLICATIONS

Waveshare, "TCS34725 Color Sensor," Version: V1.0.0, Mar. 21, 2019, 16 pages.

*Primary Examiner* — Hung H Lam (74) *Attorney, Agent, or Firm* — ZAGORIN CAVE LLP; Robert W. Holland (57) ABSTRACT

An information handling system camera detects ambient light and applies ambient light brightness to determine whether to color correct a captured image with ambient color temperature or a color temperature associated with a display. For example, a first RGB ambient light sensor detects ambient light from the camera field of view. When the ambient light is below a predetermined brightness, the camera image sensor processor (ISP) applies color temperature of a second RGB ambient light sensor directed at a display to perform color correction. For instance, with camera that mounts on a display top side, the second RGB ambient light sensor is disposed at the bottom of the camera and directed at the display.

20 Claims, 4 Drawing Sheets

(56) References Cited

U.S. PATENT DOCUMENTS

| | | | |
|---|---|---|---|
| 2017/0176755 A1* | 6/2017 | Cai | G02B 27/0179 |
| 2019/0206033 A1* | 7/2019 | Wu | G06V 40/161 |
| 2020/0020152 A1* | 1/2020 | Nakada | G06T 5/70 |
| 2021/0319589 A1 | 10/2021 | Lu | |
| 2023/0206809 A1* | 6/2023 | Lin | G09G 3/2003 345/690 |

* cited by examiner

INFORMATION HANDLING SYSTEM CAMERA VISUAL IMAGE COLOR TUNING BASED ON SENSED AMBIENT LIGHT COLOR

BACKGROUND OF THE INVENTION

Field of the Invention

The present invention relates in general to the field of information handling system cameras, and more particularly to an information handling system camera visual image color tuning based on sensed ambient light color.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing and present the information as visual images at a display. Desktop information handling systems generally have a stationary position and interface with peripheral display devices. Portable information handling systems integrate processing components, a display and a power source in a portable housing to support mobile operations. Portable information handling systems allow end users to carry a system between meetings, during travel, and between home and office locations so that an end user has access to processing capabilities while mobile. Portable information handling systems also typically interface with peripheral devices to present information, such as peripheral displays.

One important function of information handling systems is to support communication between end users with videoconferences. A videoconference relies upon a camera to capture visual images of the participants and shares the visual images through a network interface. Portable information handling systems typically integrate a camera to support communication when mobile, however integrated cameras have a small footprint that tends to restrict visual image quality. Both portable and desktop information handling system also interface with peripheral cameras to support videoconferences. One common configuration is to couple the video camera to a top side of the peripheral display so that the peripheral camera captures visual images of an end user viewing the videoconference through the display.

Typically, cameras include logic that performs color tuning of captured visual images to improve the quality of a videoconference participant's appearance, in particular, of the end user's skin tone. To accomplish this, cameras include an image sensor that captures visual images and detects ambient light color along the field of view of the camera and applies detected color temperature to tune the appearance of the end user, such as by providing white balance. One example of a white balance algorithm is Grey World White Balance that relies on an assumption that a normal well color balance photograph has an average of all colors that is a neutral grey. Based on this assumption the illuminant color cast is estimated by looking at the average color and comparing it to grey. Another example of a white balance algorithm is a White Patch Retinex algorithm, which assumes that the scene contains a bright achromatic patch that reflects the maximum light possible for each color band that is the color of the scene illuminant. Once a white balance algorithm detects color temperature from the image, it sets suitable red-gain and blue-gain to make white objects appear white. When the assumption about ambient light relied upon by these algorithms is not accurate, the resulting white balance can have a poor appearance, such as in low light conditions when viewing a display.

SUMMARY OF THE INVENTION

Therefore, a need has arisen for a system and method which tunes color of a camera visual image based on ambient light brightness.

In accordance with the present invention, a system and method are provided which substantially reduce the disadvantages and problems associated with previous methods and systems for tuning color of visual images captured by a camera. When ambient light brightness is less than a threshold, a color tuner of a camera performs color tuning based upon a color temperature of a display proximate the camera, such as a display viewed by a subject captured in a camera visual image.

More specifically, an information handling system processes information with instructions that execute on processer in cooperation with a memory that stores the instructions and information. For example, the information handling system executes a videoconference application that uses visual images of an end user captured by a camera disposed proximate a display that presents the videoconference. The camera applies conventional color tuning when an RGB ambient light sensor aligned with a field of view of the camera detects ambient light brightness of a predetermined level. For instance, the conventional color tuning applies color temperature detected along the camera field of view to Grey World or White Patch Retinex algorithms. The camera applies an alternative color tuning when the ambient brightness is less than the predetermined level to compensate for the effects of reflections of display light against the face of an end user viewing the display and captured as a visual image by the camera. For example, color of the end user face is tuned based upon a table of adjustment variables that associate color temperature of the display light and skin color of the end user.

The present invention provides a number of important technical advantages. One example of an important technical advantage is that a camera provides images with more accurate color tuning by adjusting color tuning techniques based upon ambient brightness. When ambient brightness exceeds a threshold, conventional color tuning is performed with conventional logic that applies ambient color temperature. When ambient brightness is less than the threshold, color tuning is performed with emphasis on the color temperature a display that the end user is viewing while a visual image of the end user is captured by a camera. Managing color tuning based on display color temperature when ambient brightness is low provides a more accurate visual image capture of an end user viewing the display by accounting for display light reflection off the end user's face.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera color corrects captured visual images based upon ambient light conditions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
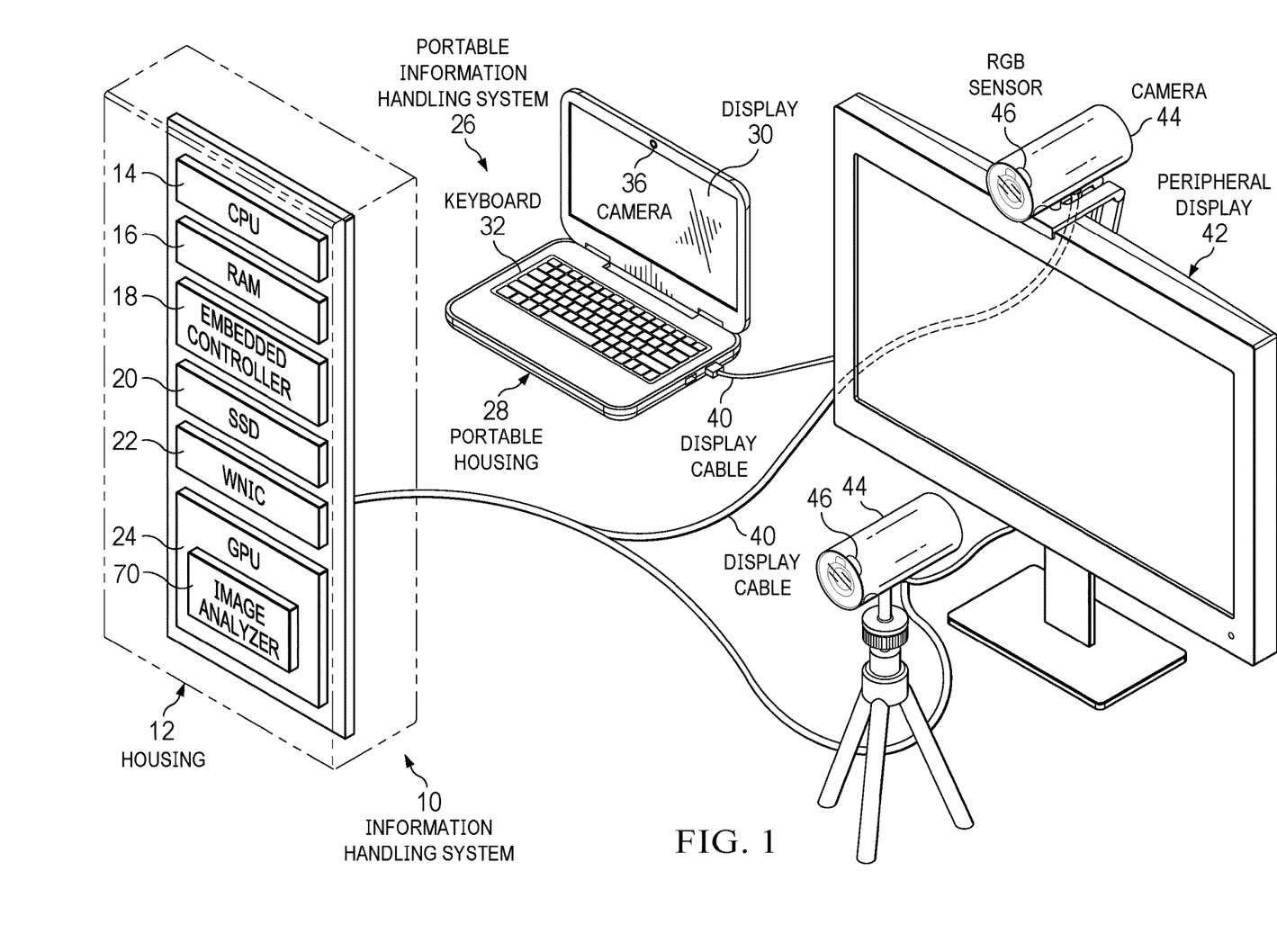
FIG. 1 depicts a block diagram of an information handling system having a peripheral camera that corrects captured image color for ambient light color temperature.

Referring now to FIG. 1, a block diagram depicts an information handling system 10 having a peripheral camera 44 that corrects captured image color for ambient light color temperature. In the example embodiment, a desktop information handling system 10 processes information with processing components disposed in a stationary housing 12. A central processing unit (CPU) 14 executes instructions to process information in cooperation with a random access memory (RAM) 16 that stores the instructions and information. An embedded controller 18 manages physical operation of the system, such as application of power, maintenance of cooling constraints and interactions with peripheral devices like a keyboard and mouse. A solid state drive (SSD) 20 provides persistent non-transitory storage of instructions and information, such as an operating system and application that are retrieved to RAM 16 for execution at system power up. A wireless network interface controller (WNIC) 22 supports network communication with external devices, such as through WiFi and BLUETOOTH. A graphics processing unit (GPU) 24 interfaces with CPU 14 to further process information for presentation as visual images, such as with pixel values that define colors of an array of pixels of a display.

In the example embodiment, a portable information handling system 26 includes processing components in a portable housing 28 similar to the desktop system. Portable information handling system 26 integrates a power source, a display 30, a keyboard 32, and a camera 36 that cooperate to further process information while the end user is mobile. For instance, integrated camera 36 supports videoconference and similar applications that use visual images captured at an information handling system. Both desktop information handling system 10 and portable information handling system 26 interface through a display cable 40 to present visual images at a peripheral display 42.

In the example embodiment, peripheral cameras 44 are deployed proximate peripheral display 42 to capture visual images of an end user viewing peripheral display 42, such as in support of a videoconference. One peripheral camera 44 couples to the top side of peripheral display 42 and the other rests on a tripod in front of peripheral display 42. In alternative embodiments, cameras that cooperate with information handling system 10 and peripheral display 42 may mount in other locations, such as integrated within peripheral display 42 similar to that of portable information handling system 26. Peripheral camera 44 communicates captured visual images in a variety of ways, such as with a cable connection directly to an information handling system, through a wireless interface directly with an information handling system like WiFi or BLUETOOTH, or with an indirect interface through peripheral display 42 or a docking station. For instance, captured visual images are managed by an information handling system with a videoconference application that sends the captured images to videoconference participants through the Internet and presents a window of the camera view at peripheral display 42.

Peripheral camera 44 includes two RGB ambient light sensors 46 that detect ambient light brightness and color temperature. A first RGB ambient light sensor 46 is disposed at a front face of peripheral camera 44 and aligned to detect ambient light along the axis of the field of view of camera 44. The second RGB ambient light sensor 46 is disposed at a bottom surface of camera 44 and directed towards an anticipated location of peripheral display 42. For instance, RGB ambient light sensor 46 when camera 44 is mounted on the top side of peripheral display 42 is directed down the plane of the display panel to detect the ambient light color temperature and brightness of the display panel. In another embodiment, RGB ambient light sensor 46 is mounted on a rear side of camera 44 so that, when the camera rests on a tripod with the rear side directed at the display, the camera can directly measure the ambient light of the display. In one example embodiment, the RGB sensor is the TCS34725.

In operation, the dual RGB sensors provide the camera image sensor processor (ISP) with additional ambient light conditions that improve color tuning of visual images captured by the camera. When the front facing RGB ambient light sensor detects greater than a defined brightness, a true color white balance is performed using conventional white balance algorithms, such as the Grey World algorithm or the White Patch Retinex algorithm. When the ambient light brightness is less than the defined amount, then the color tuning is more heavily influenced by light emitted from the display than from the front ambient light so that the color temperature of the display ambient light is applied to color tune the captured visual image. In particular, a human face captured in the visual image will reflect display panel light more heavily when the ambient light brightness is low. The reflection of display panel light if color tuned with the conventional algorithms can produce a poor image. To improve color tuning when ambient brightness is below a threshold so that display light reflects more prominently from an end user face, a set of preset tuning values are instead used based upon the detected ambient light including at least the color temperature detected from the display.

Figure 2:
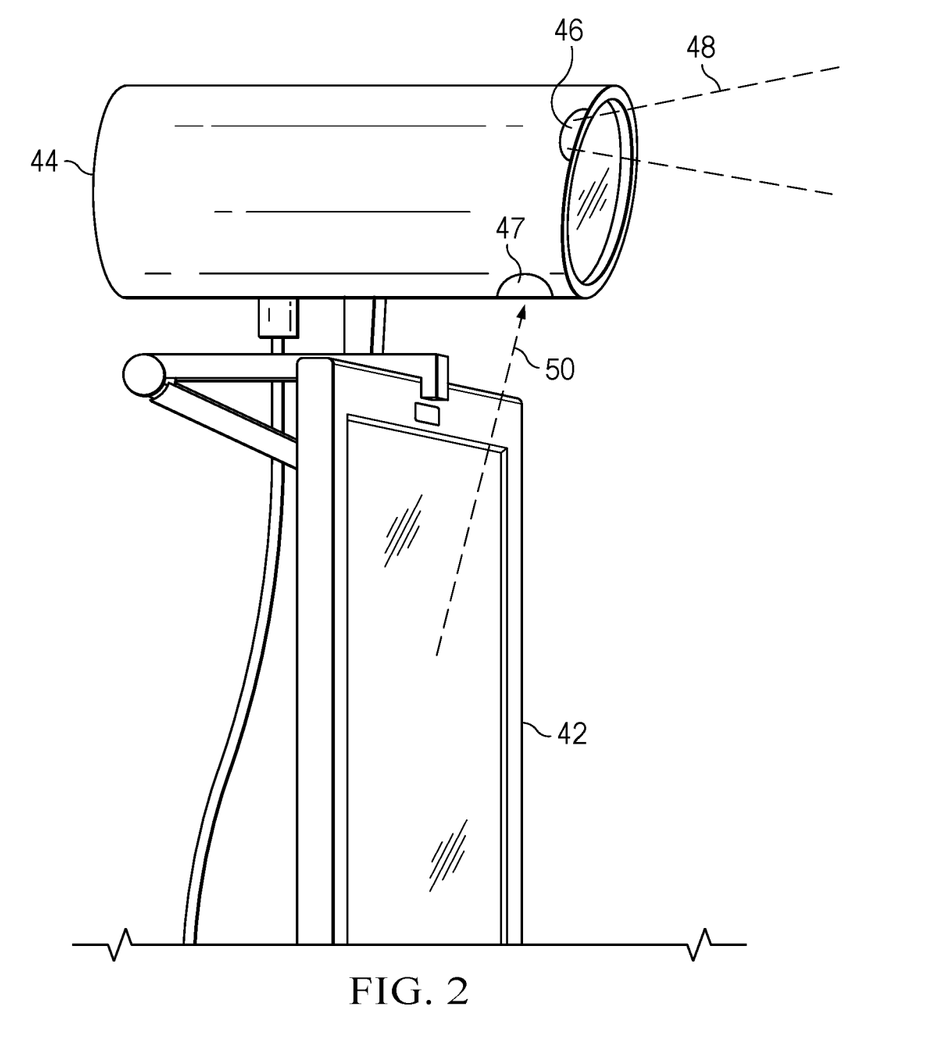
FIG. 2 depicts a side view of a peripheral camera having a first RGB ambient light sensor aligned with the camera field of view and a second RGB ambient light sensor aligned to detect a display's ambient light.

Referring now to FIG. 2, a side view depicts a peripheral camera 44 having a first RGB ambient light sensor 46 aligned with the camera field of view and a second RGB ambient light sensor 47 aligned to detect a display's ambient light. In the example embodiment, camera 44 couples to the top side of a display 42 so that display illumination color temperature and brightness are detected with a bottom RGB ambient light sensor 47 as indicated by arrow 50. Another RGB ambient light sensor 46 aligns with the field of view 48 of camera 44 to detect ambient light associated with the subject of the field of view. When brightness of field of view 48 ambient light exceeds a threshold, conventional color tuning is performed with the color temperature and brightness detected by RGB ambient light sensor 46 aligned with field of view 48. When brightness is less than the threshold, the effects of display-produced ambient light are emphasized for color tuning, such that color tuning of a human face is performed with predefined settings based upon brightness and color detected by the bottom RGB ambient light sensor 47 and the field of view ambient light sensor.

Figure 3:
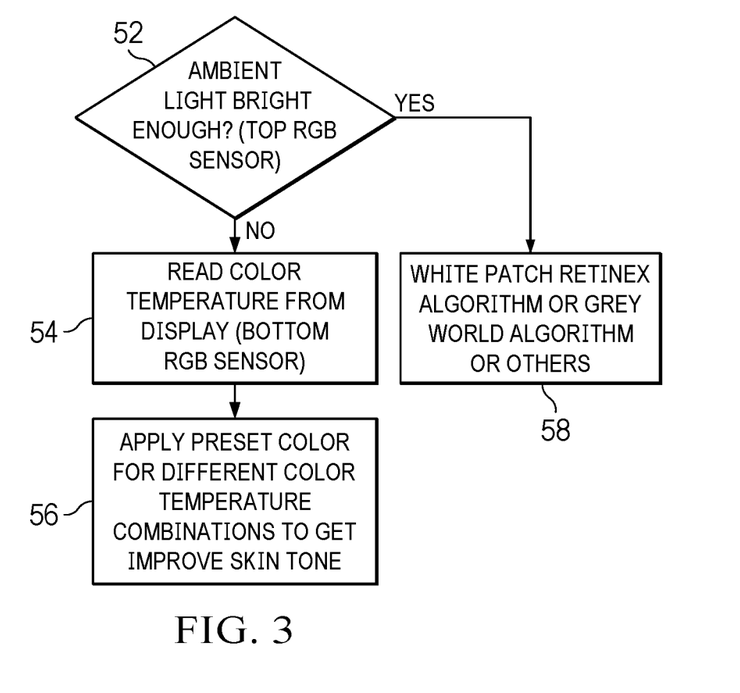
FIG. 3 depicts a flow diagram of a process for managing color correction of captured visual images based upon ambient light.

Referring now to FIG. 3, a flow diagram depicts a process for managing color correction of captured visual images based upon ambient light. In the example embodiment, the process starts at step 52 by a determination of whether the ambient light has a threshold brightness. In the example embodiment, the threshold brightness is read from the RGB ambient light sensor that aligns with the camera field of view and is set based upon camera performance. For example, conventional color tuning algorithms provide preferred image results when room ambient light brightness exceeds a threshold that washes out reflections of display light reflected from an end user's face. Below the brightness threshold, the reflection of display light from an end user face has an inordinate effect that tends to decrease the quality of a color tuned image when conventional ISP color tuning techniques are applied. The threshold for brightness depends on conditions at a camera, in an ambient environment and for presentation of visual images at a display, and may vary over time during the capture of visual images. Although the example embodiment uses a threshold for brightness measured by the top front facing RGB ambient light sensor, alternative embodiments may include comparison of brightness with the lower display-facing RGB ambient light sensor and can include factors in addition to brightness, such as color temperature and the type of application running on the information handling system and using the camera.

At step 52 when the brightness is less than the threshold the process continues to step 54 to read color temperature from the display. In the example embodiment, display light color temperature is read from the bottom RGB ambient light sensor, which is directed towards the display. In alternative embodiments, color temperature and brightness may be read from both of the RGB ambient light sensors for application at the ISP to color tune, provided the ISP has sufficient processing capabilities to adjust the color tuning based on all of the available data. In addition, the display color temperature may be provided in part or in full by other sources interfaced with the camera, such as the display scalar or information handling system GPU. At step 56, the bottom RGB ambient light color temperature is read and applied with a preset color for different color temperature combinations to get color tuning of end user skin tone with improved accuracy. For instance, a table of corrections to apply for an end user skin color is generated based upon testing that includes a relationship of the end user's skin color (white skin, yellow skin, dark skin) with the color temperature of the display light that is reflected off the end user's face. Specifically, liquid crystal display light reflected off an end user's face who is viewing a display is considered in 3×3 lookup table combinations so that different tuning settings improve skins color tone after tuning. When an ISP SoC is powerful enough to apply artificial intelligence, an extended three dimensional table may be used to adjust skin color. At step 52, when ambient light brightness exceeds the threshold, the process continues to step 58 to apply conventional color tuning at the ISP with the RGB ambient light sensor color temperature read along the field of view of the camera. For instance, ISP color tuning is performed with the White Patch Retinex or Grey World algorithm or other conventional color tuning techniques.

Figure 4:
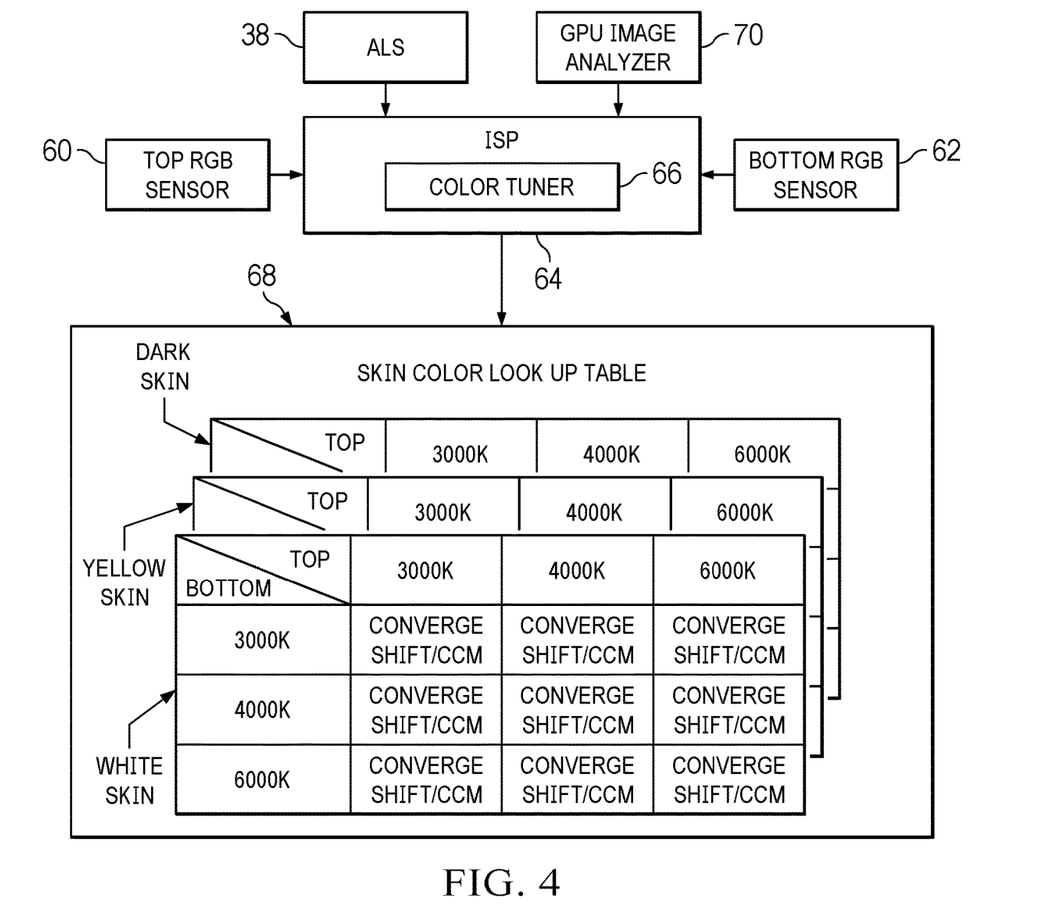
FIG. 4 depicts a block diagram of system for managing color correction of a camera's captured visual images based upon ambient light.

Referring now to FIG. 4, a block diagram depicts a system for managing color correction of a camera's captured visual images based upon ambient light. In the example embodiment, an image sensor processor (ISP) 64 receives color temperature and brightness from a top RGB ambient light sensor 60 and a bottom RGB ambient light sensor 62, where the top RGB ambient light sensor measures ambient light along the field of view of the camera and the bottom RGB ambient light sensor measures ambient light from the direction of a display. ISP 64 includes a color tuner 66 that applies conventional color tuning algorithms when brightness exceeds a threshold, such as the White Patch Retinex or Grey World color tuning algorithms. When ambient brightness is below the brightness threshold, color tuner 66 instead performs color tuning that adjusts for reflection of display light against the end user's face, such as by reading color temperature from bottom RGB ambient light sensor 62 and applying a skin color look up table 68 to perform color tuning based upon the skin color of a subject captured by the camera. In the example embodiment, color tuner 66 may use alternative color temperature information in addition to and/or in place of those read by RGB ambient light sensors of the camera. For example, a GPU image analyzer 70 of the information handling system interfaced with the camera may track color temperature of visual images provided to the display and provide the color temperature for use by color tuner 66 when an ambient light sensor 38 of the information handling system determines that the brightness is less than a threshold. In one example embodiment, color tuner 66 may be performed by a processing component of the information handling system instead of the camera. In another alternative embodiment, display color temperature may be provided by the display scalar or timing controller based upon pixel values communicated to the display and display brightness and color settings.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory disposed in the housing and interfaced with the processor, the memory operable to store the instructions and information;
a graphics processing unit disposed in the housing and interfaced with the processor, the graphics processing unit operable to process the information to define visual images for presentation at a display;
a display interfaced with the graphics processing unit and operable to present the visual images with a display color and display brightness;
an ambient light color sensor operable to detect ambient light brightness and color; and
a camera interfaced with the processor and having an image sensor processor operable to process light to generate an image, the image sensor processor having a color tuner to tune color of the image based upon ambient light, the color tuner tuning the color of the image with the color detected by the ambient light color sensor when the ambient light has a first predetermined brightness and tuning the color of the image with a color associated with the display color when the ambient light has a second predetermined brightness.

2. The information handling system of claim 1 further comprising:
a first color balance logic applied by the color tuner when the ambient light has the first predetermined brightness; and
a second color balance logic applied by the color tuner when the ambient light has the second predetermined brightness.

3. The information handling system of claim 2 wherein:
the first color balance logic comprises a Grey World algorithm or a White Patch Retinex algorithm.

4. The information handling system of claim 1 wherein the display communicates the display color and display brightness to the camera image sensor processor.

5. The information handling system of claim 1 further comprising:
a first ambient light color sensor directed to detect ambient light brightness and color at a front side of the camera; and
a second ambient light color sensor directed to detect ambient light brightness and color from display side of the camera.

6. The information handling system of claim 5 wherein the camera mounts to a top of the display and the second ambient light color sensor is directed from a bottom of the camera.

7. The information handling system of claim 5 wherein the color tuner applies the first ambient light brightness and the second ambient light brightness to a table to lookup the first and second predetermined brightness.

8. The information handling system of claim 7 wherein the table comprises color tuning parameters for each of plural skin colors.

9. The information handling system of claim 5 wherein the color tuner applies the second ambient light color to color tune only a face detected in the camera visual image.

10. A method for color tuning a visual image captured at a camera image sensor processor, the method comprising:
detecting an ambient light brightness and ambient light color of ambient light proximate the camera front face;
when the ambient light brightness is greater than a predetermined brightness, color tuning with the ambient light color; and
when the ambient light brightness is less than the predetermined brightness, color tuning based at least in part on a color and brightness of a display visual image presented by a display proximate the camera.

11. The method of claim 10 further comprising:
analyzing the visual image presented by the display to determine the color and brightness of the display visual image; and
communicating the display visual image color and brightness to the camera from external the camera.

12. The method of claim 10 further comprising:
detecting the ambient light brightness and ambient light color with a first RGB ambient light sensor exposed at a front of the camera; and
detecting the display visual image color and brightness with a second RGB ambient light sensor directed at the display.

13. The method of claim 12 further comprising:
coupling the camera to a top side of the display; and
exposing the second RGB ambient light sensor at a bottom side of the camera.

14. The method of claim 13 further comprising:
storing a lookup table in the camera accessible to the image sensor processor; and
when the ambient light brightness is less than the predetermined brightness, performing color tuning with the second RGB ambient light sensor color applied to the lookup table.

15. The method of claim 14 wherein the lookup table has a first set of color tuning values associated with a first skin color and a second set of color tuning values associated with a second skin color.

16. The method of claim 10 wherein when the ambient light brightness is greater than the predetermined brightness, color tuning is performed with a Grey World algorithm.

17. The method of claim 10 wherein when the ambient light brightness is greater than the predetermined brightness, color tuning is performed with White Patch Retinex algorithm.

18. A camera comprising:
an image sensor processor operable to generate a visual image from detected light and having a color tuner to tune the visual image based upon ambient light color;
a first RGB ambient light sensor disposed at a front of the camera and operable to detect a first ambient light brightness and first ambient color along a field of view of the camera;
a second RGB ambient light sensor disposed at a bottom surface of the camera and operable to detect a second ambient light brightness and second ambient light color off-axis from the field of view of the camera;
wherein the color tuner applies the first RGB ambient light color when the first ambient light brightness is greater than a predetermined brightness and the second ambient light color when the first ambient light brightness is less than the predetermined brightness.

19. The camera of claim 18 further comprising:
a lookup table storing color corrections to apply for color correction when the brightness is less than the predetermined brightness; and
an algorithm to apply for color correction when the brightness is greater than the predetermined brightness.

20. The camera of claim 19 wherein the table includes different color corrections based upon a skin color of a person captured by the camera.

\* \* \* \* \*